Jan. 26, 1960     R. W. WAMPLER ET AL     2,922,428
APPARATUS FOR WASHING CURVED SHEETS
Filed Nov. 9, 1955     3 Sheets-Sheet 1
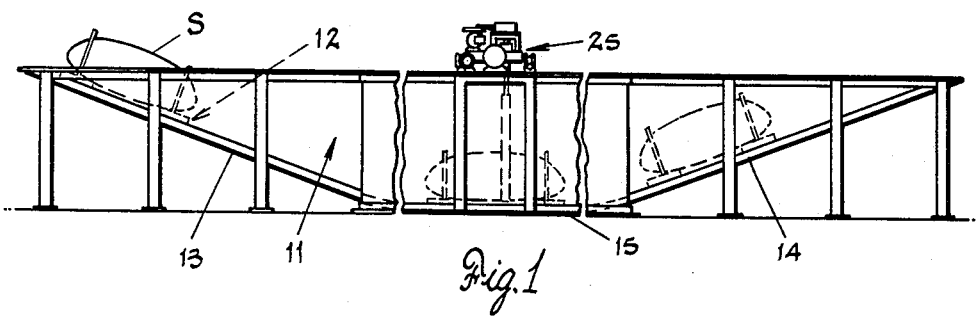
Fig. 1
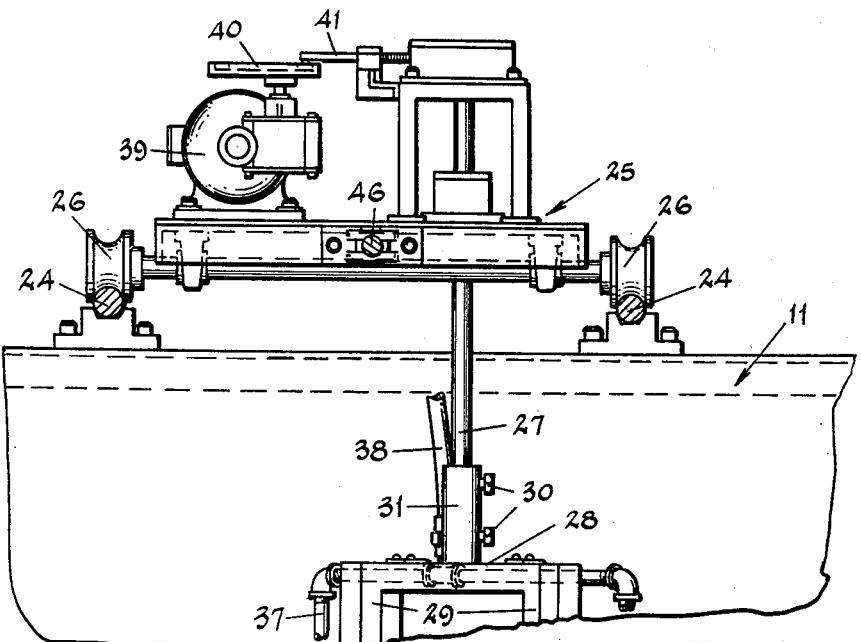
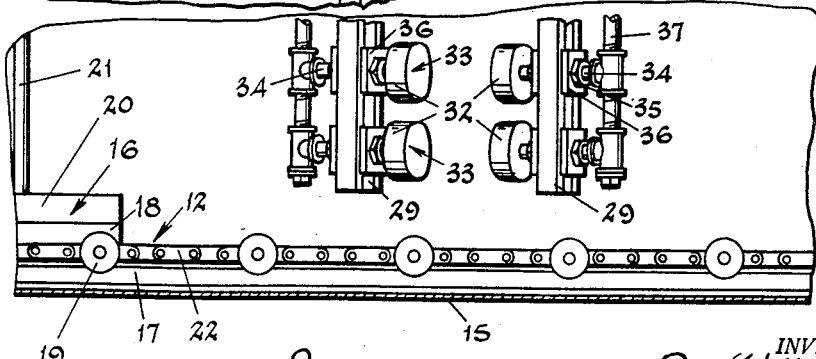
Fig. 2
INVENTORS
Roy W. Wampler
BY and Charles H. Griss
Nobbe & Swope
ATTORNEYS

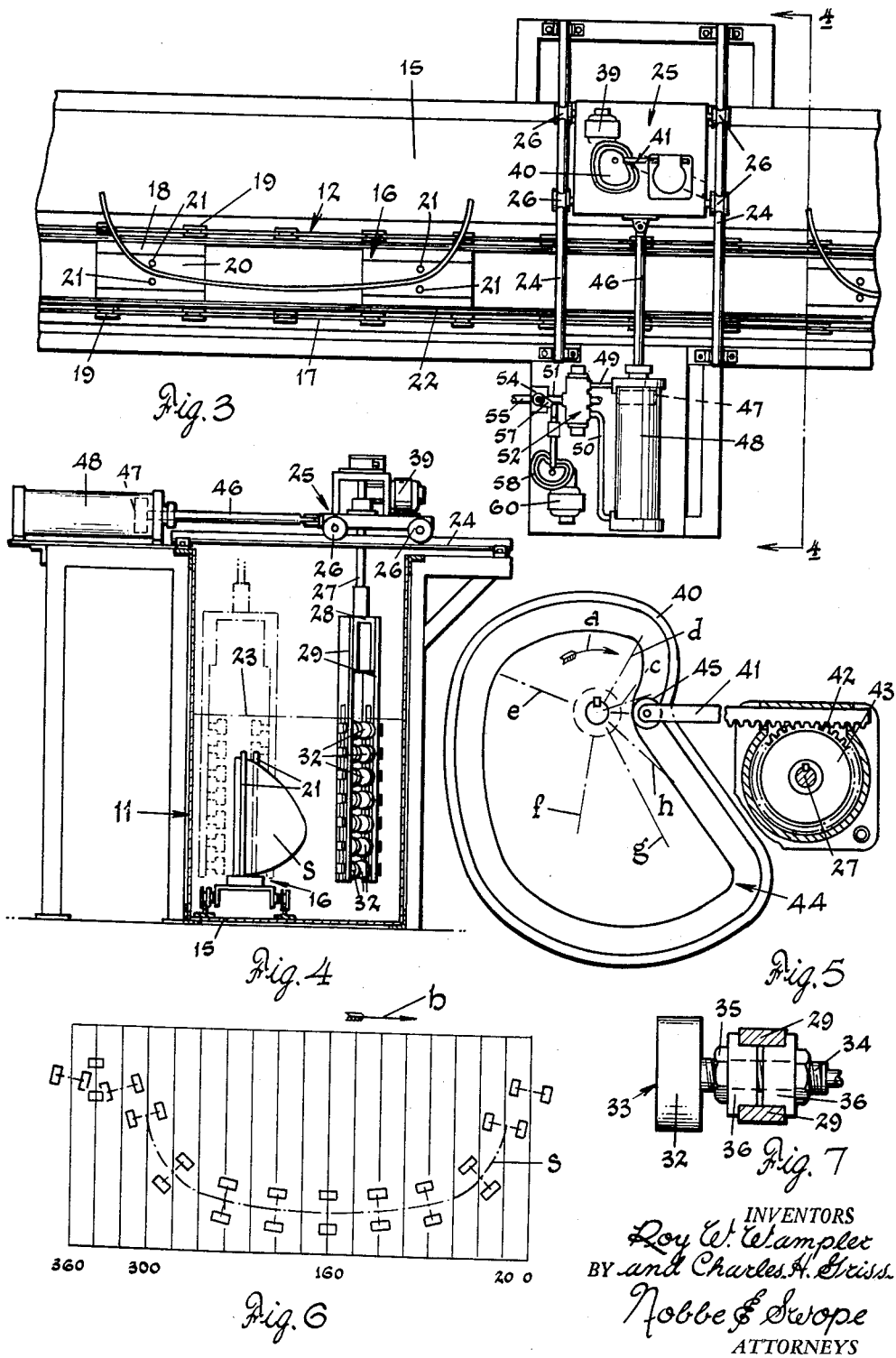

Jan. 26, 1960
R. W. WAMPLER ET AL
2,922,428
APPARATUS FOR WASHING CURVED SHEETS
Filed Nov. 9, 1955
3 Sheets-Sheet 3
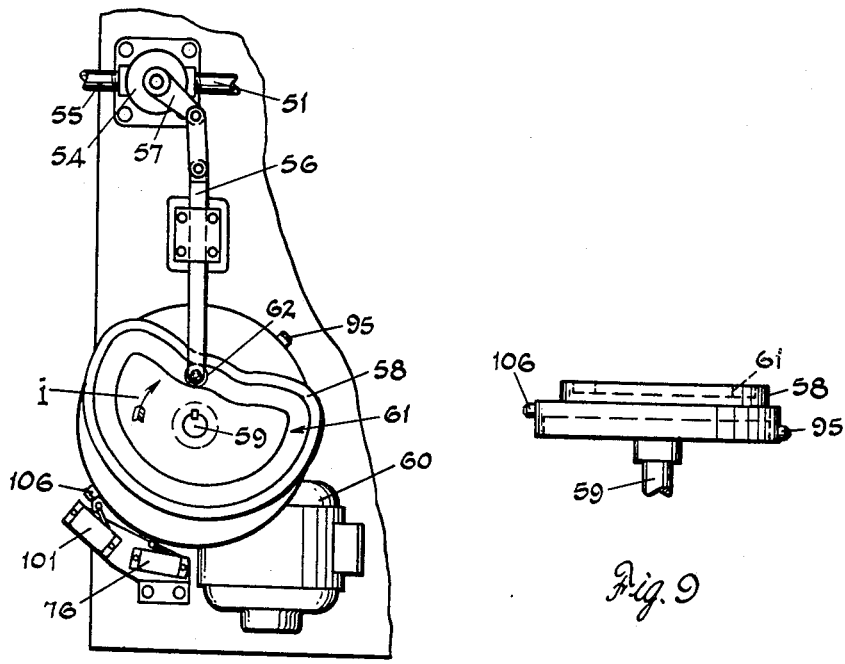
Fig. 8
Fig. 9
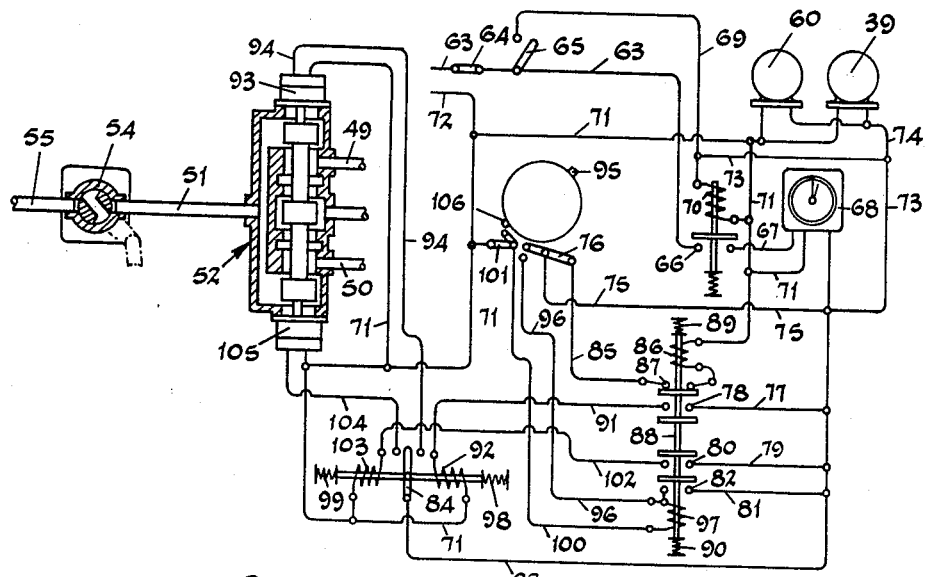
Fig. 10
INVENTORS
Roy W. Wampler
BY and Charles H. Griss
Nobbe & Swope
ATTORNEYS

United States Patent Office 2,922,428
Patented Jan. 26, 1960

2,922,428

APPARATUS FOR WASHING CURVED SHEETS

Roy W. Wampler, Toledo, and Charles H. Griss, Perrysburg, Ohio, assignors to Libbey-Owens-Ford Glass Company, Toledo, Ohio, a corporation of Ohio Application November 9, 1955, Serial No. 545,862

6 Claims. (Cl. 134—122)

The present invention relates broadly to apparatus for washing or cleaning, and more particularly to an improved apparatus for washing the surfaces of curved sheets of glass and the like.

Although the invention is not restricted to the washing of any particular article, whether of glass or other material, it is especially well adapted to carry out the difficult cleaning jobs encountered in connection with the production of present day curved laminated safety glass windshields for automobiles, and will be described in that connection here.

In the regular commercial production of such laminated windshields two sheets of bent glass and an interposed layer of tough, non brittle plastic are first assembled together to provide a glass-plastic sandwich, and, after a relatively light preliminary pressure, are finally bonded into a permanent composite unit by the action of heat and pressure while immersed in a bath of oil in an autoclave.

Both before assembly, and after laminating, it is important that the curved glass surfaces be thoroughly cleaned and this involves two difficult cleaning operations. In the first cleaning operation, in addition to normal dust and dirt, if the glass sheets have been bent as a pair, it will also be necessary to remove the parting material from their facing surfaces, and it will be readily appreciated that even one small foreign particle remaining on one of these facing surfaces would be laminated into the unit and might cause the rejection of the finished windshield.

After lamination, the outer surfaces of the laminated unit will be covered with a film of oil from the autoclave that must be completely removed.

In the early stages of development of laminated windshields it was a relatively simple matter to remove the oil or other foreign materials from the glass surfaces by conventional washing techniques, because the glass used was either flat or slightly and simply bent. However, with the advent of more and more severely curved designs, culminating in the so-called "hooked," "wraparound" or "panoramic" windshields, which are now becoming standard in automotive design, the difficulties in adequately washing the glass have become a serious commercial problem; and ordinary washing machines applicable to the cleaning of flat or slightly bent sheets have been found to be unsatisfactory.

Broadly stated, the invention contemplates an apparatus for the washing of curved surfaces in a more thorough and rapid manner than has heretofore been possible by the use of sonic or ultrasonic vibrations.

The vibration frequencies used are generally between 100 and 30,000 cycles per second and are transmitted in the form of mechanical vibration sound waves, through a suitable medium, for producing energy by means of which work is performed. More particularly, as the sound waves are propagated through the medium, which is preferably a fluid, the motion of the particles of said medium is related to the characteristics of the sound waves. In this manner, the sound waves will create cavitation in a liquid medium; cavitation being the effect of the alternate formation and collapse of gas bubbles or cavities. This collapse of the cavities creates an agitation of sufficient magnitude to actually disintegrate particles of substantially solid material; and it has been found that this vibratory agitation may be used to break down particles of foreign matter from surfaces to be cleaned so that such particles may be easily and readily removed therefrom.

In its more specific aspect, the present invention employs the phenomenon just described to wash curved glass sheets or panoramic windshields by continuously passing such glass articles through a bath of a suitable liquid medium and between generating elements which propagate vibrations within said medium in the ultrasonic range. These generating elements, which may be, for example, magnetostrictive transducers having a suitable output and frequency, are preferably arranged so as to direct the effect of said vibrations onto the glass sheets being moved therebetween along a path substantially normal to the surfaces thereof. In this manner, the effect of said vibrations is maintained at a maximum over all points of said surfaces.

By moving the curved glass sheets continuously between the generating elements, there will be, in effect, a sweeping washing action across both surfaces. Under this procedure, washing proceeds rapidly, and movement of the sheets through the liquid medium concurrent with the washing action multiplies the speed of cleaning. Moreover, when the liquid medium, into which said sheets are submerged during washing contains a detergent, the particles of foreign matter broken down upon the surfaces of the glass sheets may be even more quickly removed.

A primary object of this invention is the provision of an improved apparatus within which sheets of various shapes and curvatures can have their surfaces washed by means of vibrations in the ultrasonic range propagated to said surfaces through a liquid medium during continuous movement of said sheets through said apparatus.

Another object of this invention is the provision of an apparatus for cleaning curved glass sheets by means of vibration in the ultrasonic range through vibrating means which are controllably moved to maintain a position which corresponds with the curvature of the moving glass sheet.

Further objects and advantages of the invention will become more apparent during the course of the following description when taken in connection with the accompanying drawings.

In the drawings, wherein like numerals are employed to designate like parts throughout the same:

Fig. 1 is an elevational view illustrating the major portion of the apparatus of this invention;

Fig. 2 is an enlarged, fragmentary, elevational view of a portion of the apparatus of this invention illustrating the means for washing the glass sheets in greater detail;

Fig. 3 is a plan view of a section of the apparatus showing the control means for controlling the washing elements of this apparatus and the means for conveying curved glass sheets in cooperation therewith;

Fig. 4 is a sectional view taken along the lines 4—4 of Fig. 3;

Fig. 5 is an enlarged view of a control cam as shown in Fig. 3;

Fig. 6 is a chart illustrating the relative position of the washing elements of this invention to the position of the control cam shown in Fig. 5;

Fig. 7 is a plan view partly in section illustrating an attachment for the individual washing elements of this invention;

Fig. 8 is a plan view of a second control mechanism as shown in Fig. 3;

Fig. 9 is an elevational view illustrating the control cam of Fig. 8 in greater detail; and Fig. 10 is a diagrammatic view of the control means for synchronizing the movement of washing elements with that of the curved glass sheet as it travels on its conveyor.

Referring now more particularly to the drawings, there is shown in Fig. 1 a container 11 through which the curved glass sheets S are conveyed by a conveyor 12 for cleaning therein. The container 11 is supported by conventional supporting structure, and has sloping sides 13 and 14 to facilitate the entry and the exit of the glass sheets as they are conveyed therethrough and a bottom portion 15.

The glass sheets S are mounted on a carrier 16 which in turn moves on a track 17 composed of a pair of rails which enter the container 11 on the sloping side 13, continue across the bottom portion 15, and out through the sloping portion 14.

The carrier 16 has a floor 18 to which four wheels 19 are journaled; which wheels are of a flange and groove construction adapted to fit on the rails of the track 17. Attached to the floor of the carrier, are supports 20 which have surfaces adapted to receive the edge of the curved glass sheets to be cleaned and have vertically upstanding posts 21 which are positioned to hold the sheets S rigidly therebetween. The carriers 16 are conveyed along the track 17 by means of a chain 22 which is driven by conventional driving means (not shown).

In operation, the container 11 is generally filled with a detergent solution 23 which cooperates with the washing elements hereinafter described in cleaning off oil and grease and other foreign matter.

Laterally extending across the container 11, there is a pair of rails 24 on which a cart 25 is supported by its wheel and axle member 26 and positioned for lateral movement with respect to the container 11.

A frame shaft member 27 is rotatably mounted and is supported in a vertical position on the cart 25, and adapted to receive a frame member 28 which has a pair of vertically depending members 29 at a fixed distance from and substantially parallel to each other. In order to provide rigid attachment of frame member 28 to shaft 27, bolts 30 are threaded through a pipe shaped portion 31 of the frame member which is adapted to fit over the lower extremity of the shaft 27.

The vertically depending members 29 are preferably in the shape of an I-beam or bifurcated as is illustrated in Fig. 7. Disposed along the length of each of the members 29 are a plurality of ultrasonic washing elements 32 having vibrating surfaces 33 which are all disposed in substantially the same plane. The planes of each group of vibrating surfaces are substantially parallel to each other and spaced sufficiently to allow a glass sheet to pass therebetween. The ultrasonic washing elements 32 are supported by a threaded pipe 34 having nuts 35 fitting thereon and bearing against clamping elements 36, which clamping elements engage the vertically depending members 29 to secure the ultrasonic washing elements in rigid fixed spaced relation. The pipe 34 is attached through suitable fittings to another pipe 37 which in turn is connected to a flexible pipe 38. Electrical lead wires, and the like may be conveyed through these pipes to the ultrasonic washing elements 32.

The vibrating or energy transmitting face surfaces 33 may be formed from piezoelectric materials such as quartz or certain ceramic materials which when coupled with particular types of alternating voltages produce very high vibration frequencies. Another type of vibration generator that may be used is a magnetostriction transducer consisting of a laminated core of an alloy of ferro-magnetic material such as nickel, iron, and cobalt, which expands and contracts under the influence of a magnetic field. A third type of vibration generator of the mechanical type such as an air hammer or Hartmann whistle using air jets or water jets in the liquid medium to produce ultrasonic vibrations may also be employed in the vibration unit; and consequently the apparatus of the invention is not limited to any one specific form of energy transmitter. However, the preferred type of vibrating generator is a magnetostriction transducer.

In use, the generating faces 33, which are placed substantially parallel to the portion of the contours of the sheets S which they oppose are energized by an alternating voltage causing extremely rapid vibrations to occur on the face surfaces. Since the vibrating faces are in direct contact with the liquid medium 23, alternate positive and negative pressure fronts which travel directly from the faces to the sheets along a path normal to the glass surfaces are created. These variable pressure fronts cause a cavitation or bubble effect to take place in the medium 23 which in turn acts upon the particles of the grease, dirt, or other foreign material on the sheet by first compressing the particles towards the sheet, and then pulling the particles towards the vibration generating elements as the bubbles collapse and create a negative pressure area. In this manner, using a detergent medium as an example, as the particles are subjected to negative pressures, they are pulled from the glass surface in minute degrees allowing the liquid medium to seep into the newly created space and form a wetting layer between the particles and the glass. In a short time, the detergent action of the liquid medium between the particles causes the particles to break down and separate from each other and from the sheet thus leaving the sheet free of foreign matter. These alternate positive and negative pressure fronts may be set up from 100 to 30,000 times per second, resulting in tremendous pressures on the molecular structure of the grease or dirt during a short interval of time and preferably of vibrations higher than the frequency of sound that can be heard by the human ears are used. Consequently the detergent action of the liquid medium on the molecular structure of the deposit material causes the material to become suspended in the liquid in a matter of seconds.

Alternatively, other methods of disturbing the molecular structure on the sheets using similar type vibration generators may be practiced. If the foreign material is such that it is susceptible to crumbling or cracking under repeated fluctuations of pressure, the generators may be used in conjunction with a liquid medium having little if any detergent effect. The liquid medium in this case being used only to transmit the variable pressure wave fronts. On the other hand, if the material to be cleaned can be dissolved by an acid in causing a chemical reaction to take place between the acid and the deposit matter, a medium of this type might also be used in conjunction with the vibration sources to remove the deposit on the sheets. Other types of media may also be employed to obtain the cleansing action regardless of their chemical nature e.g. kerosene, sodium silicate as well as liquids containing certain types of abrasive material which cause an eroding action to take place on the foreign matter itself. Preferably, a detergent such as sodium lauryl sulfate is used in the form available in commercial cleaning solution.

As has been stated, an important function of this apparatus lies in the means for controlling the relative position of the faces of the vibrating elements with respect to the curved glass sheets as the glass sheets are conveyed through the cleaning apparatus. In general, there are two different movements which are imparted to the faces of the vibrating elements, namely a rotating motion which is accomplished by the rotation of the shaft 27 which in turn causes the rotation of the frame member 28 and the vibrating elements attached thereto and a reciprocating motion which is imparted to the cart 25, as hereinafter set forth, and to the vibrating elements. By the proper control of these two motions, the surfaces of the vibrating elements are caused to trace the path corresponding to the curvature of the sheet S being cleaned. The control means which controls the rotational movement of the vibrating surfaces is mounted on the cart 25 so that the entire structure which performs this function is reciprocated along with the cart 25, which movement is controlled by a second control mechanism.

The rotating control means consists of a motor 39, a cam 40 which is rotated, a cam follower 41 which has a rack gear 42 on the end thereof (as best shown in Fig. 5) and a gear 43 keyed to the shaft 27 which meshes with the rack gear 42. The cam 40 has a grooved portion 44 and the cam follower has a wheel 45 which is adapted to fit into the grooved portion of the cam so that the position of the cam follower is at all times fixedly determined by the position of the cam and motion is both directions is positively imparted to the cam follower by the cam. The cam follower has its rack gear meshed with the gear 43 of the shaft 27 so that as the cam follower moves in either direction the shaft 27 is caused to rotate which in turn causes the rotation of the surfaces of the ultrasonic washing elements. In other words, the rotational position of the surfaces of the vibrating elements are determined by the position of the cam 40, and in order to better illustrate the relationship between the cam position and that of the ultrasonic washing elements, a graph illustrating such relationship is shown in Fig. 6.

The relative positions of the vibrating elements shown in Fig. 6 are shown for the purpose of illustrating the rotation thereof and it is to be understood that the vibrating elements are not intended to move longitudinally along the glass sheet, but rather the glass sheet moves in the direction of the arrow b so that the relative movement between the vibrating elements and the glass surface results in positions substantially as shown in Fig. 6. The cam follower is shown in Fig. 5 in a position corresponding to the position marked zero on the graph of Fig. 6. As the glass sheet reaches the vibrating elements the motor 39 is started by control hereinafter described and the cam is rotated thereby in a synchronous motion. After the cam rotates 20 degrees, the cam follower will be in line with the center line c as shown in Fig. 5 and in a position relative to the glass sheet as shown by the line designated 20 in Fig. 6. After the cam has rotated 60 degrees the center line d will be in line with the cam follower and the vibrating elements will have undergone sufficient rotation so that the vibrating surfaces thereof will be substantially parallel to the surfaces of the curved glass sheet as they appear at the 60 mark on the graph of Fig. 6. When the cam rotates 160 degrees, the center line e will be in line with the cam follower and the vibrating elements will be rotated to a position which is substantially parallel to the path of movement of the curved glass sheet and at the half way mark. The center line f represents a rotation of 260 degrees, the center line g a rotation of 290 degrees and the center line h a rotation of 330 degrees and the rotational position for these positions is shown graphically in Fig. 6. As may be seen in the graph, the 300 degree position represents the position of a departure of the vibrating elements from the glass sheet, and from 300 degrees to 360 degrees, the direction of the cam follower is reversed and the rotation of the vibrating element is reversed so that at the 360 degree mark, a position corresponding to the zero degree mark is achieved, and the vibrating elements and corresponding control means are ready for activation by the entry into position of the next curved glass sheet along the conveyor.

As may be seen by looking at a plan view of Fig. 3 and noting the graph in Fig. 6, a rotational movement alone is not sufficient to keep the vibrating surfaces of the ultrasonic washing elements in proper alignment with the curved glass sheet, and it is further necessary to provide a reciprocating motion in cooperation with the rotating motion both of which must be synchronized with respect to the speed of movement of the glass sheet along the conveyor. The necessary reciprocating motion is applied to the cart 25 through a connecting rod 46 which is attached to a piston 47 riding within the cylinder 48. As has been stated, the cart is mounted on rails for reciprocating motion and carries the washing element in rotationable position therebelow. Accordingly, any transverse movement of the rod 46 will cause a corresponding transverse movement of the surfaces and the ultrasonic washing elements.

The rod 46 is moved in the cylinder 48 by virtue of hydraulic pressure acting through the piston 47. This pressure is maintained through the medium of a fluid which is communicated to each end of the cylinder through pipes 49 and 50. When a positive pressure is exerted on pipe 49, the rod 46 is caused to move at a rate depending on the magnitude of the positive fluid pressure and fluid is exhausted from the other end through the pipe 50. Similarly, when a positive pressure is exerted on the fluid in the pipe 50, the rod 40 is caused to move in the opposite direction and fluid is removed from the other end of the cylinder through the pipe 49.

The pressures in the pipes 49 and 50 are determined by the pressure in the pipe 51 and the four-way valve 52 which determines which of the pipes 49 or 50 will receive fluid of a positive pressure from pipe 51, and directs the fluid not under positive pressure to an exhaust pipe 53.

The amount of pressure in the pipe 51 is determined by the valve 54 through which fluid flows from the source pipe 55 where it is maintained at a constant pressure. The position of the control valve 54 is determined by the position of the cam follower 56 which is connected to a crank 57 which rotates the valve 54. The position of the cam follower is determined by a second cam 58 (as best shown in Fig. 8) which is rotated in the direction of the arrow i by a shaft 59 to which it is suitably keyed, and which shaft is rotated by the motor 60. The cam 58 has a groove 61 in which a wheel 62 of the cam follower 56 is fit, so that the position of the cam fixedly determines the position of the cam follower and the valve 54. Accordingly, it is seen that the position of the cam determines the amount of positive pressure which is exerted on the piston 47 thereby controlling the reciprocal movement of the cart 25 and the ultrasonic washing elements supported thereby. Beside the positive pressure control, there is a control on the four-way valve 52 which activates solenoids located at each end of the valve which in turn direct the positive pressure through one or the other of pipes 49 and 50. For example, when the washing elements are in position of the line zero of Fig. 6, the four-way valve is moved to the position of having the positive pressure communicating with pipe 49 and the pipe 50 communicating with the exhaust pipe 53. When the glass is moved to the position shown at 160 in Fig. 6, the other solenoid of the four-way valve is activated to cause the positive pressure relation to be reversed so that the positive pressure is then in the pipe 50 and the pipe 49 is then communicated with the exhaust pipe 53. Of course, when the sheet is in the position of change (160) degrees, the control valve 54 is substantially closed and the transverse movement of the ultrasonic washing elements is substantially zero. However, as the glass sheet continues in its path of travel, the transverse movement increases until after the glass sheet is passed out from between the washing elements and then the four-way valve is returned to the original position in preparation for another cycle.

In order to better understand the manner in which these controls are effected, a diagram of the wiring and the major control elements of a control system are shown in Fig. 10. This control system is given by way of illustration, and it is to be understood that other control systems may be used for controlling the means for imparting reciprocating and rotational motion to the ultrasonic washing elements in synchronous relation to each other and the movement of the curved glass sheet being cleaned. In Fig. 10 there is shown a supply line 63 on which there is a main switch 64 which is kept closed at all times during operation of the machine. On the supply line, there is a normally opened switch 65, which may be either of the "cat whisker" type, electric eye or other type adapted to be closed by the leading end of the moving glass sheet S or its carrier 16. The supply line 63 also leads to one side of the contacts 66 which in the closed position connect with line 67 which extends therefrom to an adjustable timer 68. When the control switch 65 is closed by the movement of the curved glass sheet S, it connects line 69 to the main supply line, thereby activating a solenoid 70, which has a return line 71 connecting to a main line 72. When the solenoid 70 is thus activated, the contacts 66 are moved into closed position activating the adjustable timer 68 which connects the line current to line 73.

Line 73 is connected to the supply side solenoid 70 thereby maintaining contacts 66 in closed position so long as the timer keeps the supply to line 73, and also line 73 is connected to the motor 39 which rotates the transducer frame and motor 60 which operates the control valve 54 to transversely move cart 25. The motor line connections are affected through line 74 and the return lines 71 and 72. In addition, line 73 connects the main line through the timer 68 to line 75 which leads to the closed side of the switch 76, line 77 which leads to contacts 78, line 79 to contacts 80, line 81 which leads to contacts 82 and line 83 which leads to switch 84, all of which are used as hereinafter explained.

On the closed side of switch 76 is line 85, which energizes solenoid 86 through closed flexible contacts 87 with the other side of the solenoid connected to return line 71. The solenoid 86 has an armature 88 which is normally held in a neutral position by springs 89 and 90, but on activation of the solenoid the armature is moved to close contacts 78 thereby connecting line 77 to line 91 to connect solenoid 92 which in turn closes one side of switch 84 to operate the solenoid 93 at the upper end of four-way valve 52 by connecting line 94 to the supply line and having all return lines of the involved solenoids connected to return 71. Four-way valve 52 causes the cart 25 to move inwardly across the container in timed relation to the rotation of the ultrasonic washing elements. At 160 degrees rotation of the cams, button 95 engages switch 76 to open the connection between lines 75 and 85 and close the connection between lines 75 and 96 to energize solenoid 97. When the opening of the switch 76 disconnects lines 75 and 85, the springs 89 and 90 move armature 88 to open the contacts 78 and de-energize solenoid 92 allowing springs 98 and 99 to return switch 84 to a neutral position and disconnect the solenoid at the upper end of the four-way valve. With the switch 76 directing line current into line 96, a solenoid 97 is energized causing the armature 88 to move downward thereby engaging contacts 80 and 82. The closing of contacts 82 provides an additional supply connection to solenoid 97 so that after button 95 passes switch 76 allowing it to open, the solenoid remains energized. Solenoid 97 has a return line 100 which is connected to line 71 through closed switch 101. The closed contacts 80 connects line 102 to activate the solenoid 103 which closes switch 84 to line 104 thereby activating the solenoid 105 at the lower end of the four-way valve to reverse the direction of movement of the cart 25.

Before the end of the cycle, button 106 opens the switch 101 which disconnects the return line of the solenoid 97 to de-energize same which allows springs 89 and 90 to return armature 88 to neutral. This return disconnects contacts 80 and 82 thereby de-energizing solenoid 103 which allows springs 98 and 99 to return the switch 84 to normal thereby opening the contact to line 104 and de-energizing the solenoid 105 at the lower end of the four-way valve. The unequal pressure on the four-way valve causes the valve to return to neutral position which stops the cart 25. Also at the end of the cycle, the timer 68 opens lines 73, 74, 75, 77, 79, 81 and 83. However, there is sufficient time between the opening of the switch 99 and the opening of the timer switch for motors 39 and 60 to operate to the end of the cycle and place the transducer in its original position.

After the glass sheet has been cleaned, it is brought out of the container 11 at the exit end by the conveyor and passed over into a rinsing tank to remove the detergent solution. After being rinsed the glass sheet is dried by an air blast and ready for laminating or packing, whatever the case may be.

It is to be understood that the form of the invention disclosed herein is to be taken as the preferred embodiment thereof, and that various changes in the shape, size and arrangement of parts as well as various procedural changes may be resorted to without departing from the spirit of the invention or the scope of the following claims.

We claim:

1. A washing apparatus, comprising a conveyor for moving a curved sheet along a single straight path, washing elements having vibrating faces disposed in a line extending across said sheet, and means for moving said washing elements in both a rotatory and a translatory manner to maintain a substantially parallel alignment of said faces with the surface of the curved sheet while said sheet is moving along said straight path.

2. A washing apparatus comprising a conveyor, means for holding curved sheets on said conveyor in a substantially vertical position, a frame member having a pair of vertically extending members, washing elements on each of said vertically extending members, the washing elements having vibrating faces substantially parallel to and opposite each other and spaced a distance sufficient to allow a glass sheet to pass therebetween, means for moving the frame member in a rotary motion, a control mechanism activated by said conveyor to control the means for rotating the frame member to keep the vibrating faces of the washing elements substantially parallel to the surface of the glass sheet being washed, means for moving said frame member in a horizontal reciprocal motion, and a control mechanism operated by said conveyor to keep the means for moving the frame member in a reciprocal motion synchronized with the movement of the curved sheet whereby the sheet is maintained between the vibrating faces of the washing elements.

3. A washing apparatus comprising a conveyor, means for holding curved sheets in a substantially vertical position on said conveyor, a container adapted to be filled with a detergent solution and having the conveyor passing therein and thereout, a frame member having a pair of vertically extending members, washing elements on each of said vertically extending members, the washing elements having vibrating faces substantially parallel to and opposite each other and spaced a distance sufficient to allow a glass sheet to pass therebetween, means for moving the frame member in a rotary motion, a control mechanism activated by said conveyor to control the means for rotating the frame member to keep the vibrating faces of the washing elements substantially parallel to the surface of the glass sheet being washed, means for moving said frame member in a horizontal reciprocal motion, and a control mechanism operated by said conveyor to keep the means for moving the frame member in a reciprocal motion synchronized with the movement of the curved sheet whereby the sheet is maintained between the vibrating faces of the washing elements.

4. A washing apparatus comprising a conveyor, means for holding sheets in a substantially vertical position on said conveyor, a container adapted to be filled with a detergent solution and having the conveyor passing therein and thereout a carrier positioned at the upper end of said container, said carrier being maintained for horizontal movement across said container and supporting a frame member having a pair of vertically extending members, washing elements on each of said vertically extending members, the washing elements having vibrating faces substantially parallel to and opposite each other and spaced a distance sufficient to allow a glass sheet to pass therebetween, means for moving the frame member in a rotary motion, a control mechanism activated by said conveyor to control the means for rotating the frame member to keep the vibrating faces of the washing elements substantially parallel to the surface of the glass sheet being washed, means for moving said carrier in a horizontal reciprocal motion, and a control mechanism operated by said conveyor to keep the means for moving the carrier in a reciprocal motion synchronized with the movement of the curved sheet whereby the sheet is maintained between the vibrating faces of the washing elements.

5. A washing apparatus as defined in claim 4, in which the means for moving the frame member in a rotary motion includes a cam for controlling the position of rotation of the frame member.

6. A washing apparatus, comprising a conveyor, means for holding curved sheets on said conveyor, a frame member having a pair of depending members, washing elements on each side of said members, the elements having vibrating faces substantially parallel to and opposite each other and spaced to allow a glass sheet to pass therebetween, means for rotating the frame member, a control mechanism activated by the conveyor for controlling the rotating means to maintain the vibrating faces of the washing elements substantially parallel to a surface of the glass sheet passing therethrough, means for reciprocatingly moving the frame member horizontally, and a second control mechanism operated by said conveyor for synchronizing the reciprocating moving means with the movement of the glass sheet whereby the sheet is maintained between the vibrating faces and spaced therefrom.

References Cited in the file of this patent

UNITED STATES PATENTS

| | | |
|---|---|---|
| 829,547 | Schwarzenbach | Aug. 28, 1906 |
| 2,259,260 | Matteson | Oct. 14, 1941 |
| 2,290,286 | Leckie | July 21, 1942 |
| 2,619,098 | Walters | Nov. 25, 1952 |
| 2,724,666 | Myers | Nov. 22, 1955 |
| 2,784,119 | McCown | Mar. 5, 1957 |